March 10, 1970  R. SCHULTZ  3,500,120
SAFETY AUTOMOTIVE LIGHTING CIRCUITS

Filed Sept. 9, 1968  3 Sheets-Sheet 3

INVENTOR.
RUDD SCHULTZ.
BY John H. Oltman
ATT'Y.

United States Patent Office 3,500,120
Patented Mar. 10, 1970

3,500,120
SAFETY AUTOMOTIVE LIGHTING CIRCUITS
Rudd Schultz, 611 SE. 18th Ave.,
Pompano Beach, Fla. 33060
Filed Sept. 9, 1968, Ser. No. 758,372
Int. Cl. B60g 1/02; A47l 1/00; B60s 1/02
U.S. Cl. 315—82                    20 Claims

ABSTRACT OF THE DISCLOSURE

In automatic vehicle, an interlock circuit for preventing the windshield wipers of the vehicle from being turned on, when the vehicles' ignition is on, without also turning on the head lamps of the vehicle. Preferably, the interlock circuit also includes switching means associated with the ignition switch and the light switch of the vehicle so that if the light switch is in its parking lamp activating position and the ignition switch is in its on position, the head lamps of the vehicle are turned on rather than the parking lamps thereof.

BACKGROUND OF THE INVENTION

In some states there are laws which require that all automotive vehicles which are operated when it is raining must have their head lamps turned on. Some drivers are unfamiliar with these laws, or forget them, or for some other reason fail to turn on the head lamps of their vehicle when driving in the rain. In order to prevent this situation, the present invention provides an interlock circuit for the electrical system of automotive vehicles which prevents the windshield wiper of the vehicle from being turned on without also turning on the head lamps of the vehicle when the vehicle's ignition is on. This interlock circuit may be installed on any or all automotive vehicles as a safety measure since its utility is not limited to those states having laws as described above.

In a preferred embodiment of the invention, the interlock circuit includes contact means in the light switch of the vehicle connected between the battery and a control switch for energizing the windshield wiper motor arranged so that the light switch must be operated to turn on either the parking lamps or the head lamps in order to activate the control switch so that it can be operated to turn on the windshield wiper motor. With this arrangement it is possible to turn on the windshield wiper when just the parking lamps are on. This is desirable when the vehicle's engine is not running, but when the engine is running, it should not be possible to turn on the windshield wiper without also turning on the head lamps. Accordingly, the interlock circuits of the preferred embodiment also include switching means associated with the ignition switch of the vehicle for switching from parking lamps to head lamps when the ignition switch is on at a time when the parking lamps are activated. This feature could be utilized separately from the head lamp and windshield wiper feature.

SUMMARY OF THE INVENTION

The invention provides an interlock circuit for the electrical system of an automotive vehicle comprising a wiring connection between the battery and a wiper control switch of the vehicle, another wiring connection between the battery and the headlamps of the vehicle, and interlock contacting means in one of these wiring connections controlled by either the control switch or a light switch of the vehicle to prevent energization of the vehicle's windshield wiper motor without also turning on the headlamps when the vehicle's ignition is on. In one embodiment, the interlock contacting means is a part of the light switch, and completes the connection between the battery and the control switch upon operation of the light switch. This enables or activates the control switch so that it can then be operated to turn on the wiper. In this embodiment, the interlock circuit also includes switching means associated with the ignition switch and arranged so that when the light switch is operated to its parking lamp activating position and the ignition switch is at its on positon, the head lamps are energzed rather than the parking lamps. The switching means may alternatively be associated with a gear shift selector as will be described.

In another embodiment of the invention, the interlock contacting means comprises a relay having a coil connected to the wiper control switch and contacts connected between the battery and the head lamps. The relay contacts are normally open, but when the control switch is operated to turn on the wipers, the relay energizes and the contacts close to automatically turn on the head lamps.

In still another embodiment, a relay is connected in the head lamp activating circuit so that its coil is energized when the headlamps are turned on. The relay has contacts connected to the wiper control switch which close when the relay coil is energized to enable or activate the control switch so that it can then be operated to turn on the wiper motor.

ON THE DRAWINGS

Figure 1:
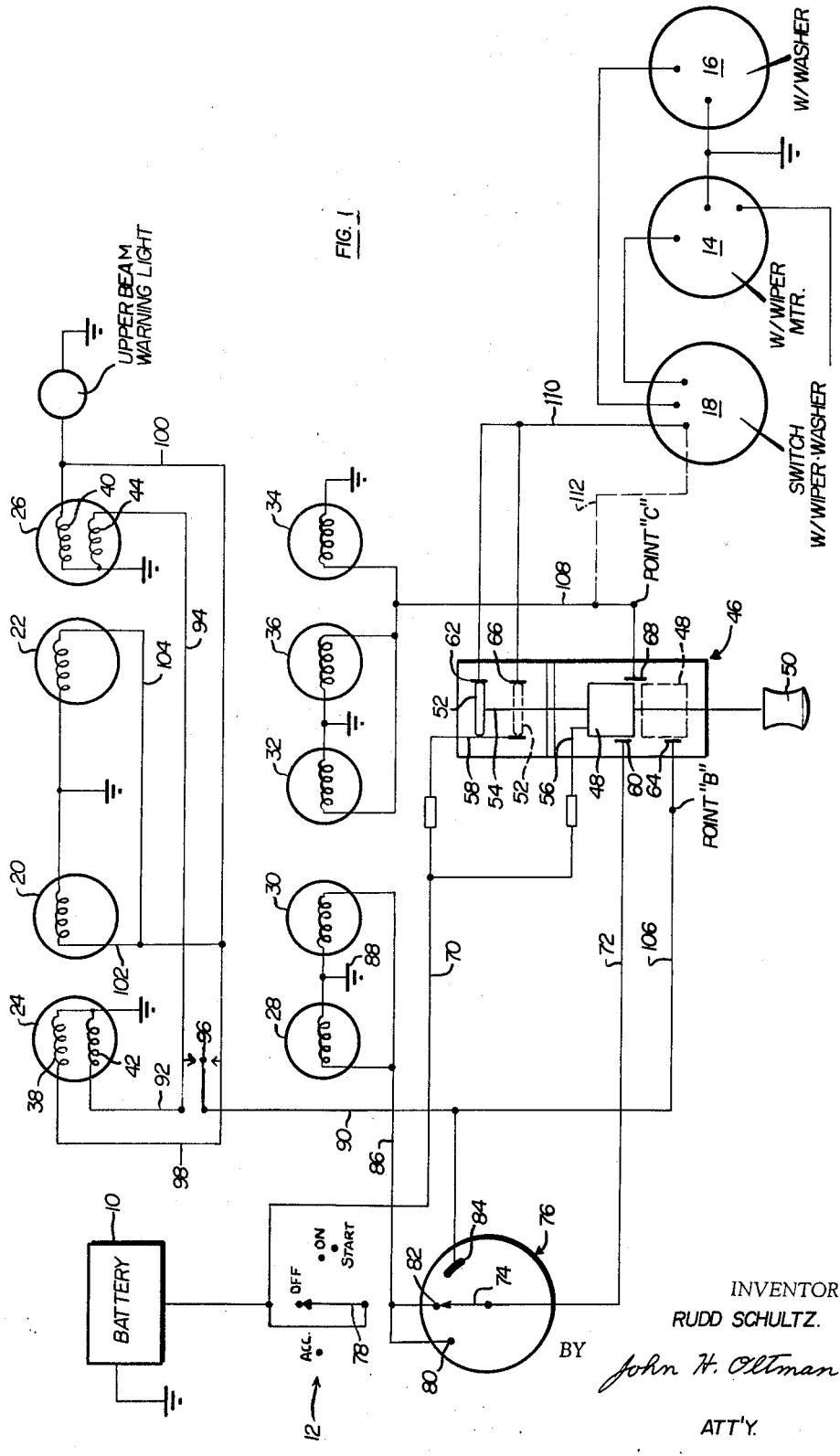
FIGURE 1 is a circuit diagram for part of an electrical system for an automotive vehicle including an interlock circuit in accordance with one embodiment of the invention.

Referring first to FIGURE 1, the automotive electrical system shown there includes a battery 10, an ignition lock switch 12, an electrical motor 14 for driving the windshield washer 16, and a control switch 18 for controlling the motor 14 and washer 16. These elements are standard parts of automotive vehicles at the present time, and need not be illustrated in detail. The electrical system has several lamps including upper beam head lamps 20 and 22, lower beam head lamps 24 and 26, parking lamps 28 and 30, tail lamps 32 and 34, and a license light 36. The lower beam head lamps 24 and 26 have low beam filaments 38 and 40, and also have upper beam filaments 42 and 44 for operation in conjunction with the upper beam head lamps 20 and 22. All of these lamps are also standard elements in automotive vehicles at the present time.

A light switch 46 is provided which is modified somewhat as compared to the standard light switch in present day automotive vehicles. Light switch 46 includes a movable contactor 48 operable reciprocably by pulling or pushing a knob 50. The movable contactor 48 is connected to an auxiliary contactor 52 by any suitable connection 54 so that the two contactors move together. The contactor 52 is part of the interlock contacting means provided in accordance with the invention.

The contactors 48 and 52 have an off position, a parking lamp activating position, and a head lamp activating position. The contactors are shown in FIGURE 1 in the parking lamp activating position, and they can be moved together to the head lamp activating position shown in dashed lines by pulling on the control knob 50. The contactors 48 and 52 can also be moved rearwardly to an off position (not shown) by pushing on the control knob 50. In all positions of the contactors 48 and 52, they are in electrical contact respectively with slide contacts 56 and 58. Separate contacts can be used rather than slide contacts so that contactors 48 and 52 are isolated at the off position. When contactors 48 and 52 are in the parking lamp activating position, contactor 48 is in electrical contact with a fixed switch contact 60, and contactor 52 is in electrical contact with a fixed switch contact 62. When the contactors 48 and 52 are in the head lamp activating position, contactor 48 is in electrical contact with a fixed switch contact 64, and contactor 52 is in electrical contact with a fixed switch contact 66. In both the parking lamp and head lamp activating positions, contactor 48 is in electrical contact with a fixed switch contact 68.

The slide contacts 56 and 58 are connected by line 70 to the battery 10. Fixed contact 60 is connected by line 72 to the movable contact 74 of a rotary switch 76 which is associated with the ignition switch 12 of the vehicle. The rotary contact 74 of switch 76 and the rotary contact 78 of ignition switch 12 are ganged together so that each has an accessory position, an off position, an on position, and a start position as indicated on ignition switch 12. The connections for the ignition switch 12 are standard and so are not illustrated herein. The connections for rotary switch 76 are illustrated in FIGURE 1.

Rotary switch 76 has a fixed contact 80 at the accessories position, a fixed contact 82 at the off position, and a fixed contact 84 bridging the on and start positions. Fixed contacts 80 and 82 are connected together to a line 86 which leads through the parking lamps 28 and 30 to ground at 88. Fixed contact 84 is connected to a line 90 which leads to the head lamps 20, 22, 24 and 26. Line 90 is connected by branch lines 92 and 94 to the low beam filaments 42 and 44. Line 90 is connected through a foot switch 96 to branch lines 98 and 100 which lead to the high beam filaments 38 and 40, and also to branch lines 102 and 104 which lead to the high beam head lamps 20 and 22.

Returning to the light switch 26, the fixed contact 64 for the head lamp activating position of the light switch is connected by a line 106 to line 90 which, as previously described leads to the head lamps. The fixed contact 68 is connected by line 108 to the tail lamps 32 and 34 and the license plate lamp 36. The fixed contacts 62 and 66 are both connected by line 110 to the control switch 18 for controlling the windshield wiper motor 14 and the washer 16. It may be seen that line 110 is the only power supplying line leading to control switch 18, and this means that control switch 18 cannot be operated to turn on the motor 14 unless contactor 52 is in either the parking lamp activating position or the head lamp activating position.

The operation of the embodiment of FIGURE 1, will will now be described. If the movable contactors 48 and 52 of light switch 46 are initially in the off position, they do not make contact with any of the fixed contacts 60, 62, 64, 66 and 68. Consequently, none of the lamps are on, and the windshield wiper motor 14 cannot be turned on by operating the control switch 18. Assuming now that control knob 50 is pulled to move contactors 48 and 52 to the parking lamp activating position as shown in FIGURE 1, contactor 48 is in electrical contact with fixed contacts 60 and 68, and contactor 52 is in contact with fixed contact 62. Of course, the contactors are also in contact with slide contacts 56 and 58. Current is supplied from battery 10 through line 70, contact 58, contactor 52, contact 62 and line 110 to the control switch 18. This means that the control switch is now enabled so that it can be operated to turn on the windshield wiper motor 14.

Assuming that rotary contact 74 is in the off position as shown, current is also supplied from the battery 10 through line 70, slide contact 56, contactor 48, fixed contact 60, line 72, contacts 74 and 82, and line 86 to the parking lamps 28 and 30, thus lighting these lamps. It is perfectly satisfactory to allow operation of the windshield wipers with only the parking lamps on so long as the ignition switch is off or in the accessory position. However, when the engine is running, it should not be possible to turn on the windshield wiper without turning on the head lamps rather than the parking lamps. To this end, the switch 76 causes the head lamps to switch on when the ignition switch is turned to the on position. In this event, movable contact 74 is in contact with fixed contact 84, so current is supplied from line 72 through contacts 74 and 84 to line 90 which leads to the head lamps.

It may be noted that if the control switch 18 is turned off, the head lamps remain on. It may also be understood that the multi-position switch 76, or a similar switch, could be connected to a shift lever of the vehicle so that contact 74 would be positioned at contacts 80 and 82 respectively at the parking and neutral positions of the shift lever, and would be connected to contact 84 in the drive position of the shift lever. In this way, if the light switch 46 is in the parking lamp activating position and the shift lever is in the drive position, the head lamps will be turned on rather than the parking lamps. Although this arrangement is entirely feasible, it is believed that the use of the switch 76 in association with the ignition switch 12 is more practical.

If the control knob 50 is pulled to move the contactors 48 and 52 to their head lamp activating positions, current is supplied from battery 10 through line 70, contactor 48, contact 64, line 106, and line 90 to the head lamps. Also, current is supplied from battery 10 through line 70, contact 58, contactor 52, contact 66, and line 110 to the control switch 18 so that the control switch may be operated to turn on the windshield wiper motor 10.

It would be possible to eliminate the contactor 52 and fixed contacts 58, 62 and 66. This could be accomplished by connecting the control switch 18 directly to fixed contact 68 as indicated by the dashed line 112 in FIGURE 1. Whenever the contactor 48 is in either its parking lamp activating position or its head lamp activating position, current is supplied through fixed contact 68 and line 108 to the tail lamps 32 and 34 and the license lamp 36. Some of this current could be diverted to the control switch 18 if the connection 112 were provided to replace the movable contactor 52 and its associated fixed contacts as mentioned previously. However, this arrangement has the disadvantage that the control switch 18 is not isolated from the head lamps. A similar result could be achieved by connecting the control switch 18 directly to fixed contacts 64, for example at terminal B. In this event, the control switch 18 is activated whenever the light switch 46 is operated to its head lamp activating position. This connection would replace the movable contactor 52 and its associated fixed contacts. Again, this arrangement has the disadvantage that the control switch is not isolated from the head lamps, and also the control switch would not be activated when the light switch 46 is in its parking lamp activating position.

Figure 2:
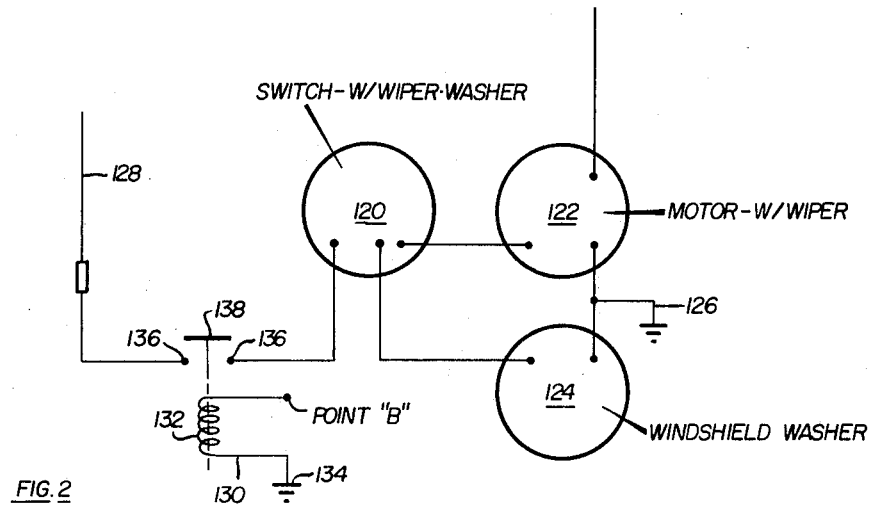
FIGURE 2 is a circuit diagram for part of an electrical system showing an interlock circuit in accordance with another embodiment of the invention.

FIGURE 2 illustrates another embodiment of the invention. Only a part of the electrical system of an automotive vehicle is shown in FIGURE 2, and it will be understood that the remainder of the system may be like that shown in FIGURE 1. The system includes a windshield wiper and washer control switch 120 connected to an electrical motor 122 for operating the windshield wiper and also connected to a windshield washer 124. The motor and the washer are grounded at 126. A line 128 is connected to the battery of the system (not shown) and to the control switch 120. Another line 130 is connected to the main head lamp activating circuit (not shown) which is controlled by the light switch, and as indicated in FIGURE 2, the line 130 may be connected to a terminal such as terminal B in FIGURE 1 which is in the main head lamp activating circuit. Line 130 passes through the coil 132 of a relay which is grounded at 134. In addition to coil 132, the relay includes fixed contacts 136 which are connected in line 128 and a movable contact 138 which is controlled by the coil 132. Contacts 136 and 138 are normally open so that line 128 is interrupted and the control switch 120 cannot be operated to turn on the windshield wiper motor 122 nor the washer 124. When the light switch, such as light switch 46, is turned on to the head lamp activating position so as to complete circuit 106 (FIGURE 1), current passes from terminal B through coil 132 and line 130 to ground at 134. This energizes coil 132 so that it pulls in contact 138 to close fixed contacts 136, thus completing line 128 on the battery to the control switch 120. Thus, now that the head lamps have been turned on, the control switch 120 is enabled so that it can be operated to turn on the windshield wiper motor 122 and also the windshield washer 124. The control switch 120 can be turned off without affecting the head lamps.

Figure 3:
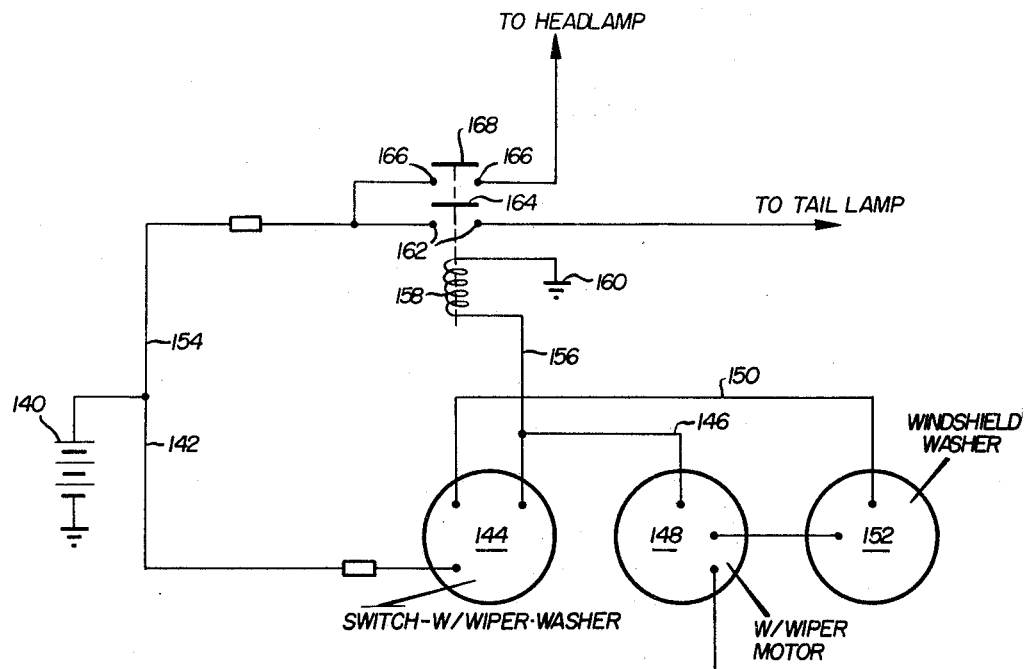
FIGURE 3 is a circuit diagram of part of an electrical system showing an interlock circuit in accordance with still another embodiment of the invention.

FIGURE 3 illustrates another embodiment of the invention, and again only a part of the electrical system of an automotive vehicle is shown. A battery 140 is connected by a line 142 to a control switch 144 which in turn is connected by line 146 to a windshield wiper motor 148 and by line 150 to a windshield washer 152. Thus, in this embodiment, the motor 148 and washer 152 can be turned on at any time by simply operating the control switch 144. Another line 154 is connected from the battery 140 to the head lamps of the vehicle (not shown) and also to the tail lamps of the vehicle (not shown). It will be understood that the head lamps and tail lamps could be arranged as in FIGURE 1. The line 154 bypasses the light switch for controlling the lamps, and it is to be understood that a light switch like switch 46 in FIGURE 1 is also provided for manual control of the vehicle's lights. Connected to line 146 at the output side of control switch 144 is a line 156 which is connected through a coil 158 of a relay to ground at 160. The relay also includes fixed contacts 162 and a movable contact 164 connected to the line 154 and the tail lamps, and fixed contacts 166 and a movable contact 168 connected to line 154 and also to the head lamps. These contacts are normally open, and the movable contacts 164 and 168 can be pulled in by energization of the relay coil 158.

The operation of the embodiment of FIGURE 3 is as follows. The lights of the vehicle are normally controlled by a light switch such as light switch 46 in FIGURE 1. However, when the control switch 44 is turned on so as to start the wiper motor 148, current flows through line 142 and line 156 through the relay coil 158 to ground at 160. This energization of relay coil 158 pulls in movable contacts 164 and 168 to close contacts 162 and 166. Thus, current also flows from the battery 140 through line 154 to the head lamps and the tail lamps of the vehicle causing them to light up. When the control switch 144 is turned off, the relay 158 is deenergized, thus turning off the head lamps and tail lamps unless the main light switch is also turned on. Thus, this embodiment has the disadvantage that the lights may be turned off when the windshield wiper control switch 144 is turned off.

Figure 4:
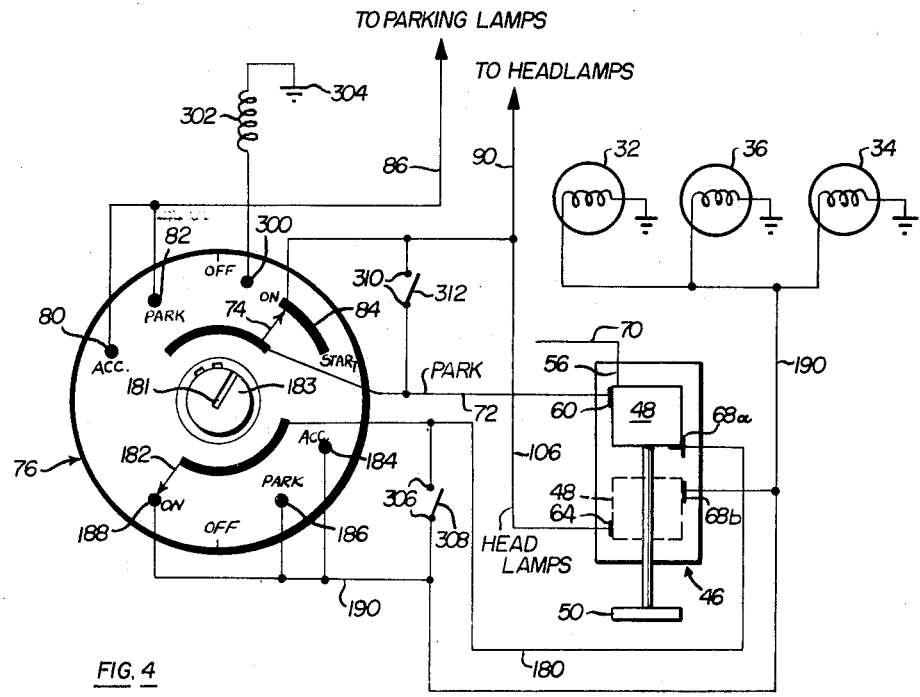
FIGURE 4 is a circuit diagram showing a modification of the interlock circuit of FIGURE 1.
Figure 5:
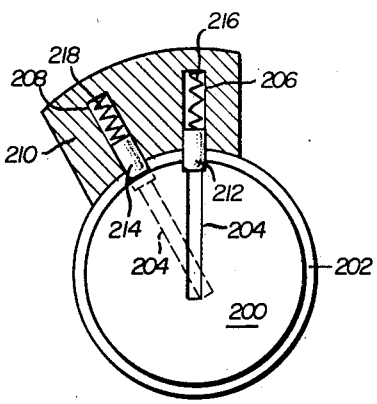
FIGURE 5 is a perspective view of an ignition lock which may be used in conjunction with a switch included in FIGURE 4.
Figure 6:
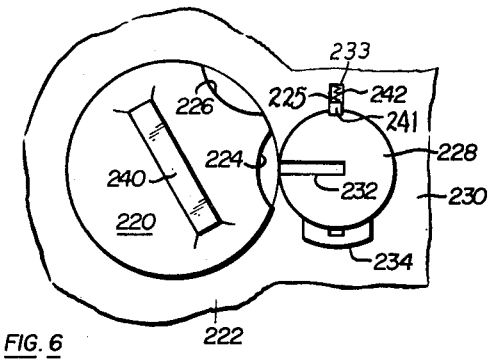
FIGURE 6 shows a modified lock.

FIGURES 4, 5 and 6 illustrate a modification of the rotary switch 76 of FIGURE 1 and the light switch 46 of FIGURE 1 which automatically turns off all lights when the key is removed from the ignition switch and which also provides a park position on the ignition switch in which the key can be removed without turning off the parking lamps. Not all of the system is shown in FIGURE 4, but it will be understood that the remainder of the system is exactly as shown in FIGURE 1. Since most of the parts in FIGURE 4 are the same as in FIGURE 1, the same reference numerals are used for like parts. The light switch 46 has the same positions as the light switch 46 in FIGURE 1, except that the contactor 52 and fixed contacts 58, 62 and 66 for controlling the switch 18 are not shown in FIGURE 4. However, the contactor 48 is shown along with the fixed contacts 56, 60 and 64. The fixed contact 68 of FIGURE 1 is split into two fixed contacts 68a and 68b in FIGURE 4. Fixed contact 68a is connected by a line 180 to a movable contact 182 on the switch 76 which is provided for the purpose of automatically controlling the tail lights as will be explained. Switch 76 also includes fixed contacts 184, 186 and 188 which are all connected to a common line 190 leading to the tail lamps 32 and 34 and the license plate lamp 36. Movable contact 182 is linked to movable contact 74 which is the same as in FIGURE 1, and the two movable contacts move together. Switch 76 includes fixed contacts 80, 82 and 84 just as in FIGURE 1. Contact 80 is at the accessory position, and contact 84 bridges the on and start positions of movable contact 74. Contact 82 in FIGURE 4 is at a park position, and there is no fixed contact at the off position of the switch. Contacts 80 and 82 are both connected to line 86 which leads to the parking lamps (not shown), the parking lamps being the same as lamps 28 and 30 in FIGURE 1. The fixed contact 84 is connected by line 90 to the head lamps (not shown), the head lamps being the same as lamps 20, 22, 24 and 26 in FIGURE 1.

Fixed contact 68b of the switch 46 is connected directly to the line 190 which leads to the tail lamps 32 and 34 and the license lamp 36. Contact 64 is connected by line 106 to line 90 which in turn leads to the head lamps. Contact 60 is connected by line 72 to the movable contact 74 which is the same as in FIGURE 1. Contact 56 is the slide contact which is always in electrical contact with the movable contactor 48. A line 70 is connected from a battery such as battery 10 (see FIGURE 1) to slide contact 56.

The operation of the embodiment of FIGURE 4 is as follows. When the switch 46 is in the parking lamp activating position, the movable contactor 48 is in electrical contact with fixed contacts 60 and 68a. Thus, current flows from line 70 through contactor 48 and line 72 to the movable contact 74. Current also flows from line 70 through contactor 48 and line 180 to the other movable contact 182 of switch 76. When movable contacts 74 and 182 are in the on position as shown, the head lamps and the tail lamps of the vehicle are lighted. When movable contacts 74 and 182 are in either the accessories position or the park position, the parking lamps of the vehicle are lighted. When movable contacts 74 and 182 are in the off position, all lights are turned off since there are no fixed contacts in switch 76 at the off position. The windshield wiper could be turned on even though the lights are off because switch 46 is in park position. When the control knob 50 of switch 46 is pulled to the head lamp activating position, movable contactor 48 is in electrical contact with fixed contacts 64 and 68b as shown by the dashed line in FIGURE 4 representing contactor 48. With the switch 46 in this position, current flows from line 70 through contactor 48 and line 106 to the head lamps, thus turning them on. Current also flows from line 70 through contactor 48 and line 190 to the tail lamps 32 and 34 and the license lamp 36, thus turning these lamps on. The switch 76 has no control over the lamps when the switch 46 is in the head lamp activating position. Thus, the head lamp activating position might also be considered as a manual position, and the parking lamp activating position might be considered as an automatic position.

As previously mentioned, the key can be removed from the slot 181 of the ignition switch including rotary switch 76 in either the off position or the park position of the switch. Slot 181 is in a plate 183 which turns to move contacts 74 and 182. The reason for allowing the key to be removed from the ignition switch in the park position is that it is desirable to be able to park the vehicle, remove the key and leave the parking lamps lighted. This can be done when the switch is put in the park position and the key is then removed.

FIGURE 5 shows an ordinary ignition lock arranged so as to permit removal of the key in two positions. A rotatable plate 200 is provided in a housing 202, and plate 200 has a slot 204 for receiving a key. The slot 204 can be lined up with two slots 206 and 208 and an extension 210 of the housing 202. Detents 212 and 214 are provided in slots 206 and 208 with springs 216 and 218 urging the detents toward the plate 200. With this arrangement, the key can be removed from the slot 204 when it is aligned with either of the slots 206 and 208, but cannot be removed in any other position of the plate 200. A lock of this type could be used in connection with the ignition switch 76 of FIGURE 4.

FIGURE 6 shows another type of lock which could be used. This lock has a rotary plate 220 in a housing 222, the plate having recesses 224 and 226. Another rotatable plate 228 is mounted in an extension 230 of the housing 222, and this plate has a slot 232 for receiving a key. The slot 232 can be lined up with a slot 233 in extension 230, or it can be rotated to a horizontal position as shown. Plate 228 has an extension latch 234, and this latch is shaped to fit in either of the recesses 224 and 226. Plate 220 has a turning boss 240 on it, and this boss is lined up with the park position as shown in FIGURE 6. In this position, the recess 224 lines up with the plate 228. Thus, the plate 228 could be rotated by turning a key in the slot 232 clockwise to line up the the key with slot 224 and at the same time move the latch extension 234 into recess 224. The key could then be removed from the slot 232. A suitable detent 241 is provided in slot 233 along with a spring 242. Thus, when the lock is in the park position, the key can be removed from the slot 232.

Similarly, if the plate 220 is rotated so that the boss 240 is vertical and so lines up with the off position of the lock, the key can also be removed from the slot 232. This would be accomplished by rotating the plate 228 to line up slot 232 with slot 233 and simultaneously move extension 234 into recess 226. In all other positions of plate 220, the key could not be removed from slot 232.

Referring again to FIGURE 4, when the movable contacts 74 and 182 and plate 183 are in the on position as shown and are turned to the start position, they return automatically to the on position when released. This is conventional and is accomplished by suitable biasing. Contact 84 bridges the on and start positions, so that if switch 46 is in either of its on positions, the headlights remain on when contact 74 is moved to start position. Obviously, contact 84 could be provided only at the on position such that all lights would go off when contact 74 is moved to the on position. It is also apparent that other lights, such as a fog light and/or an auxiliary light, could be wired through the switch 76. It would be possible to have an auxiliary light on the side of the vehicle wired through switch 76 so that this light and the head lights would go on together.

FIGURE 4 includes an optional feature whereby the head lamps and tail lamps will remain on for a short period of time when the movable contact 74 is moved from its on position to its off position if the main light switch 46 is in its automatic position. For this purpose, a contact 300 is provided between these off and on positions so that it can be engaged by movable contact 74. Contact 300 is connected through a coil 302 of a time delay relay to ground at 304. This relay has fixed contacts 306 and a movable normally open contact 308 connected across lines 180 and 190, and fixed contacts 310 and a movable normally open contact 312 connected across lines 72 and 90. When movable contact 74 is moved from its on position to its off position, it momentarily touches contact 300. This is sufficient to energize coil 302 which in turn pulls in contacts 308 and 312 for a short time depending on the time delay of the relay. Thus, current flows from line 72 through contact 312 and line 90 to the head lamps and from line 180 through contact 308 and line 190 to the tail lamps, thus keeping these lamps lit for a short time. When the relay times out, contacts 308 and 312 open and the lights go out. The light supplied during the short period when the lights remain on may be of assistance in enabling the driver to find his way to a destination upon leaving the car. It is to be noted that when this feature is provided, it would be desirable to provide the off position at the extreme right or left of the switch 76 next to the on position so that contact 309 would not be engaged when moving contact 74 from its on position to park or accessories position.

It has been proposed that the head lamps and tail lamps of a vehicle should always be turned on when the vehicle is operating. This can be accomplished automatically with the circuit of FIGURE 4 by simply eliminating switch 46, and connecting line 70 directly to line 72 and also to line 180. Lines 106 and the connections to contacts 680 and 686 would also be eliminated. The switch 76 would then completely control the lights. With contacts 74 and 182 in the on position, the head lamps and tail lamps would be on. With contacts 74 and 182 in the off position, all lights would be off. With contacts 74 and 182 in either the park or accessories positions, the parking lamps and tail lamps would be on. With this arrangement, since the head lamps would always be on when the ignition switch is in the on position, there is no need for any connection to the windshield wiper control switch and it could be turned on at any time. A simple double-pole on-off switch may be wired between the battery and lines 90 and 190 so that the lights may be turned on when switch 76 is off. The latter switch may be interlocked with the ignition switch to turn it off automatically when the ignition switch is turned on.

It is apparent from the foregoing description that the invention provides an interlock circuit for an automotive electrical system which accomplishes several automatic functions. The interlock circuit prevents the windshield wiper of the vehicle from being turned on without also turning on the lights of the vehicle when the ignition is on. The headlamps and the windshield wiper may be turned on together when the ignition switch is in an on position, or in one embodiment, the head lamps and the windshield wiper may be turned on when the gear shift selector is in a drive position. The interlock circuit may also include a switch which automatically turns on the head lamps rather than the parking lamps when the switch is in an on position and the main light switch of the vehicle is in a parking lamp activating position or automatic position. This switch may be arranged as in FIGURE 4 so that all lights are turned off when the key is removed from the switch in an off position of the switch, or the key may be removed in a park position of the switch to leave the parking lights on. The windshield wiper may be turned on when the switch is in either of these positions so long as the main light switch is in either the automatic position or a manual position.

Having thus described my invention I claim:

1. In an electrical system for an automotive vehicle having an engine, a battery, head lamps, parking lamps, a light switch, a windshield wiper driven by an electrical motor, and a control switch having an off position and also a stable on position for operating the windshield wiper motor non-cyclically and continuously, with no bypass around said control switch to said motor, the improvement of an interlock circuit comprising a first wiring connection between said battery and said control switch, a second wiring connection between said battery and at least one of said lamps, and interlock contacting means in one of said wiring connections controlled by one of said switches to prevent continuous energization of said windshield wiper motor by operating said control switch to said stable on position without turning on said one lamp in at least one operating condition of the vehicle.

2. An interlock circuit as claimed in claim 1 in which said interlock contacting means is a part of said light switch and is connected in said first wiring connection so that upon operation of said light switch to turn on said one lamp, said interlock contacting means completes said first wiring connection to said control switch allowing said motor to be energized continuously by operation of said control switch to said stable on position, and upon operation of said light switch to turn off said lamps, said interlock contacting means interrupts said first wiring connection to disable said control switch.

3. An interlock circuit as claimed in claim 2 in which said light switch has a head lamp activating position and a parking lamp activating position with first and second switch contacts respectively for said positions, said second wiring connection is connected to said head lamps through said first switch contacts, and said interlock circuit further includes a third wiring connection through said second switch contacts between said battery and said parking lamps, and ignition switch means in said third wiring connection having accessory, off and on positions, said ignition switch means having contacts for said off and accessory positions connected to said parking lamps and having contacts at said on position connected to said head lamps so that when said light switch is operated to said parking lamp activating position and said ignition switch is turned to said on position, said head lamps are energized rather than said parking lamps.

4. The interlock circuit as claimed in claim 3 in which said interlock contacting means comprises fixed switch contacts forming a part of said light switch connected by said first wiring connection to said battery and to said control switch, and a movable contactor forming a part of said light switch for closing said fixed switch contacts in said headlamp activating position and said parking lamp activating position of said light switch.

5. The interlock circuit as claimed in claim 3 in which said vehicle includes tail lamps, and said interlock contacting means comprises third switch contacts of said light switch connected to said control switch for said windshield wiper and also to said tail lamps, said light switch operating to complete said first wiring connection to said control switch through said third switch contacts when said light switch is in either said head lamp activating position or said parking lamp activating position.

6. The interlock circuit as claimed in claim 1 in which said second wiring connection to said head lamps bypasses said light switch, said vehicle includes a separate wiring connection between said battery and said head lamps through said light switch, and in which said interlock contacting means comprises a relay having a coil connected between said control switch and a point of reference potential so that when said control switch is operated to energize said windshield wiper motor said relay coil is also energized, and relay contacts connected in said second wiring connection normally opening the same but completing said second wiring connection to said head lamps upon energization of said relay coil.

7. The interlock circuit as claimed in claim 1 in which said second wiring connection is connected between said battery and said head lamps via said light switch so that said light switch when operated completes said second wiring connection to turn on said head lamps, said second wiring connection includes a coil of a relay which is energized upon completion of said second wiring connection, and said relay includes normally open contacts connected in said first wiring connection, said relay contacts closing upon energization of said relay coil to complete said first wiring connection to said control switch, whereby said relay provides said interlock contacting means.

8. In an electrical system for an automotive vehicle having a battery, head lamps and parking lamps, the combination of a light switch having an off position, a parking lamp activating position and a head lamp activating position, said light switch having a movable contactor and first and second fixed contacts respectively for said parking lamp activating position and said head lamp activating position, a first wiring connection through said movable contactor and said first fixed contacts between said battery and said parking lamps, a second wiring connection through said movable contactor and said second fixed contacts between said battery and said head lamps, and further switch means having a movable contact and at least third and fourth fixed contacts at said first and second positions respectively, said movable contact and said third contact being connected in said first wiring connection, and said fourth contact being connected to said head lamps, whereby when said light switch is operated to said parking lamp activating position and said further switch is in said second position, said head lamps are energized rather than said parking lamps.

9. The combination as claimed in claim 8 in which said vehicle has a gear shift selector and said further switch is operated by said gear shift selector.

10. The combination as claimed in claim 8 in which said vehicle has an ignition lock and said further switch is operated by said ignition lock.

11. The combination as claimed in claim 10 in which said ignition lock has off, on and accessory positions, said further switch has first, second and third positions corresponding respectively to said off, on and accessory positions, said third and fourth contacts are respectively at said first and second positions, and said further switch includes a fifth contact located at said accessory position also connected in said first wiring connection.

12. The combination as claimed in claim 10 in which said ignition lock has accessory, on, park and off positions, said further switch has first, second, third and fourth positions corresponding respectively to said accessory, on, park and off positions, said third and fourth contacts are respectively at said first and second positions, and said further switch includes a fifth contact at said third position also connected in said first wiring connection.

13. The combination as claimed in claim 12 in which said further switch has no contacts at said fourth positon thereof so that the lamps are turned off when said ignition lock is in said off position.

14. The combination as claimed in claim 13 in which said ignition lock so constructed so that a key may be removed therefrom in either said off positon or said park position thereof.

15. The combination as claimed in claim 13 in which said further switch includes a sixth fixed contact between said second and fourth positions engageable by said movable contact and connected to a coil of a time delay relay, said relay having normally open contacts connected across said further switch between said first wiring connection and said head lamps, so that when said movable contact enagages said sixth contact, said coil is energized to close said relay contacts for a predetermined time to thereby energize said head lamps.

16. For use in combination with an electrical system for an automotive vehicle including a battery, headlamps, and switch means connected between said battery and said head lamps for turning said headlamps on and off; windshield wiper motor means, including a control operable to turn said wiper motor means on and off, and means coupling said control to said switch means to actuate said switch means to turn said headlamps on when said control is actuated to turn said wiper motor means on.

17. In an electrical system for an automotive vehicle having a key operated ignition lock, a battery, head lamps and parking lamps; the combination of switch means having a movable contact operated by said ignition lock upon turning a key therein, said movable contact having an off position, a park position and an on position, said switch means further having first and second fixed contacts respectively at said park and on positions engageable by said movable contact, a conductive connection between said battery and said movable contact, means connecting said first fixed contact to said parking lamps, and means connecting said second fixed contact to said head lamps, whereby when said movable contact is in said off position neither of said lamps is energized, when said movable contact is in said park position said parking lamps are energized, and when said movable contact is in said on position said head lamps are energized.

18. The electrical system as claimed in claim 17 in which said vehicle has tail lamps and said switch means includes a second movable contact having the same positions as said first named movable contact and also operated by said ignition lock, third and fourth fixed contacts respectively at said park and on positions of said second movable contact and engageable by said second movable contact, means connecting said battery to said second movable contact, and means connecting said third and fourth fixed contacts to said tail lamps, whereby when said second movable contact is in either the park or on position thereof said tail lamps are on, and when said second movable contact is in said off position thereof said tail lamps are off.

19. An interlock circuit as claimed in claim 2 in which said control switch may be turned from said stable on position to said off position thereof without turning said one lamp off, a distinct further effort being required to turn said one lamp off.

20. In an electrical system for an automotive vehicle having an engine, a battery, an ignition switch having accessory, off and on positions, headlamps, parking lamps, a light switch for operating said lamps, windshield wiper motor means, and control means for controlling actuation of the windshield wiper motor means, the improvement wherein said light switch is coupled to said control means so that said light switch must be operated to turn on at least one of said lamps to permit actuation of said windshield wiper motor means by said control means, and wherein said system further includes a further pair of switch contact means each connected between said battery and a respective one of said lamps, said light switch having a parking lamp activating position in which one of said pair of switch contact means is energized and a headlamp activating position in which the other of said pair of switch contact means is energized, said ignition switch including a movable contact connected to said one switch contact means, fixed contacts for said accessory and off positions of said ignition switch connected to said parking lamps, and a fixed contact for said on position of said ignition switch connected to said headlamps, said movable contacts being engageable with any of said fixed contacts in accordance with the position of said ignition switch, so that when said light switch is in said parking lamp activating positon and said ignition switch is turned to said on position, the headlamps are energized rather than the parking lamps.

References Cited
UNITED STATES PATENTS

| | | | |
|---|---|---|---|
| 1,909,072 | 5/1933 | Prescott | 315—83 X |
| 2,464,847 | 3/1949 | Coffey | 318—468 |
| 3,058,142 | 10/1962 | Pollock | 15—250.02 |

JAMES W. LAWRENCE, Primary Examiner

C. R. CAMPBELL, Assistant Examiner

U.S. Cl. X.R.

15—250.02; 315—77; 318—468